United States Patent
Lubenski

(10) Patent No.: US 9,769,855 B2
(45) Date of Patent: Sep. 19, 2017

(54) MOBILITY IN ENTERPRISE NETWORKS

(71) Applicant: GENBAND US LLC, Frisco, TX (US)

(72) Inventor: Zeev V. Lubenski, North Andover, MA (US)

(73) Assignee: GENBAND US LLC, Plano, TX (US)

( * ) Notice: Subject to any disclaimer, the term of this patent is extended or adjusted under 35 U.S.C. 154(b) by 434 days.

(21) Appl. No.: 14/144,579

(22) Filed: Dec. 31, 2013

(65) Prior Publication Data

US 2015/0063221 A1 Mar. 5, 2015

Related U.S. Application Data

(60) Provisional application No. 61/871,202, filed on Aug. 28, 2013.

(51) Int. Cl.
*H04W 76/02* (2009.01)
*H04W 88/16* (2009.01)

(52) U.S. Cl.
CPC .......... *H04W 76/022* (2013.01); *H04W 88/16* (2013.01)

(58) Field of Classification Search
CPC . H04W 76/025; H04W 76/022; H04W 88/16; H04L 62/20; H04L 67/10; H04L 63/0428
USPC ............... 370/229, 230, 328, 329, 331, 401; 455/426.1, 433; 709/223
See application file for complete search history.

(56) References Cited

U.S. PATENT DOCUMENTS

| | | |
|---|---|---|
| 2002/0010758 A1 | 1/2002 | Chan |
| 2004/0249963 A1 | 12/2004 | Klaghofer et al. |
| 2008/0144637 A1* | 6/2008 | Sylvain ............... H04L 65/1043 370/401 |
| 2011/0312300 A1* | 12/2011 | Silver ................. H04W 76/022 455/410 |
| 2012/0189016 A1* | 7/2012 | Bakker ............... H04W 76/021 370/401 |
| 2013/0308527 A1* | 11/2013 | Chin ..................... H04W 76/06 370/328 |

FOREIGN PATENT DOCUMENTS

WO 2006/122213 A2 11/2006

OTHER PUBLICATIONS

European Patent Office, "International Search Report," issued in PCT Application No. 14/72906, Mailed Date: Jun. 25, 2015, 11 Pages.

(Continued)

*Primary Examiner* — Charles C Jiang
*Assistant Examiner* — Wali Butt
(74) *Attorney, Agent, or Firm* — Fogarty LLP

(57) ABSTRACT

Embodiments of methods and systems for mobility in enterprise networks are presented. The methods and systems described herein provide a mobile wireless device with access to both an enterprise network and an external network by establishing a proxy connection between a gateway component of the enterprise network and a gateway component of the external network. Such embodiments may maintain the security of the enterprise network. Additionally, such embodiments may not require modification of the User Equipment (UE) or of components of the external network. Indeed, the methods and systems may operate transparently to both the UE and to components of the external network.

21 Claims, 16 Drawing Sheets

(56) References Cited

OTHER PUBLICATIONS

European Patent Office, "Extended European Search Report," Application No. 14876740.3—1505, Jul. 18, 2017, 7 pages.
3GPP Draft; S3-130560 CL, 3RD Generation Partnership Project (3GPP), "3rd Generation Partnership Project; Technical Specification Group Services and System Aspects; Feasibility study on IMS firewall traversal (Release 12))." Apr. 14, 2013, XP050709783, Mobile Competence Centre; 650 Route Des Lucioles; F-06921 Sophia-Antipolis Cedex; France, Retrieved from the Internet: URL:http://www.3gpp.org/ftp/tsg_sa/WG3_Security/TSGS3 71Valencia/Docs/.

\* cited by examiner

MOBILITY IN ENTERPRISE NETWORKS

TECHNICAL FIELD

This disclosure relates generally to telecommunications, and more specifically, to mobility in enterprise networks.

BACKGROUND

The following discussion sets forth the inventors' own knowledge of certain technologies and/or problems associated therewith. Accordingly, this discussion is not an admission of prior art, and it is not an admission of the knowledge available to a person of ordinary skill in the art.

Enterprises, such as corporations, universities, government organizations, and other organizations often have need to develop internal networks which provide employees access to proprietary data. Such networks typically require heightened security and policies to protect the proprietary data from theft or unauthorized access. On a small scale such networks may be set up as Local Area Networks (LANs). Corporate LANs may include security devices, such as firewalls, for establishing a separation between the local network components and external components. These private networks are often referred to as enterprise networks.

Historically, enterprise networks have primarily been implemented using wired connections. Such designs have been suitable because, until recently, most network users accessed network resources through desktop terminals with dedicated wired connections. More recently, with the emergence of WiFi networks, users have accessed the network via a laptop or other portable device via a WiFi Wireless Access Point (WAP). The WiFi WAPs have generally been connected to other components of the enterprise network via wired connections.

One drawback of using WiFi WAPs in enterprise networks is that there is no correlation between WiFi and Public mobile network and mobile device used in the enterprise WiFi environment is generally used as a "tablet" with WiFi data connectivity only, but the mobile devices typically lose any cell phone functionality.

With evolution of communications toward mobile communications technologies such as Long Term Evolution (LTE) technologies, many enterprises are looking to incorporate wireless mobile infrastructure in enterprise networks. LTE networks are typically deployed in various layers. For example, a Macro Layer cell may provide several miles of coverage and may provide access to several thousand users per cell. Micro or Pico Layer cells may provide localized coverage for both outdoor and/or indoor environments and my handle several hundred users per micro cell. Femto Layer cells are generally used for indoor coverage and may handle several dozen users per femto cell. There are several benefits to using mobile communications technologies, including scalability, mobility from cell to cell, and the ability to enforce QoS policies and other security and network performance policies. Thus, LTE is one example of a wireless communication technology that supports overlapping heterogeneous networks/cells.

Unfortunately, there are also some drawbacks to use of mobile communications technologies in enterprise networks. Mobile devices in fact don't belong to the enterprise but the Service Provider network. Actual subscriber policies, network security and data routing are not under control, of the enterprise administration. A further difficulty is providing access to a mobile device to both the enterprise network and the external network without specially modifying the mobile device to handle access to both networks.

SUMMARY

Embodiments of methods and systems for mobility in enterprise networks are presented. An embodiment includes a method for providing a wireless device with simultaneous access to an enterprise network and an external network. Such an embodiment may include establishing a proxy connection between a gateway device in the enterprise network and a gateway device in the external network. The method may also include receiving a communication request from the wireless device at the gateway device in the enterprise network. Additionally, the method may include determining whether the communication request requires a connection to the enterprise network or to the external network. The method may also include facilitating communications between the wireless device and the external network through the proxy connection in response to a determination that the communication request requires a connection to the external network.

BRIEF DESCRIPTION OF THE DRAWINGS

Reference will now be made to the accompanying drawings, wherein.

DETAILED DESCRIPTION

Embodiments disclosed herein are directed generally to methods and systems for mobility in enterprise networks. The embodiments include methods for creating wireless enterprise networks using mobile IP-bases technologies, where a wireless device having an IP air interface can access resources on both the enterprise network and an external network, such as a provider/macro-level network. The methods and systems described herein provide a mobile wireless device with access to both an enterprise network and an external network by establishing a proxy connection between a gateway component of the enterprise network and a gateway component of the external network. Such embodiments may maintain the security, mobility and the routing policies of the enterprise network. Additionally, such embodiments may not require modification of the User Equipment (UE) or of components of the external network. Indeed, the methods and systems may operate transparently to both the UE and to components of the external network.

Beneficially, such embodiments may provide users of mobile wireless devices with access to the Internet and other components of an external IP network while simultaneously providing access to enterprise resources under enterprise administration control. A further benefit of the present embodiments is the ability to leverage QoS policy management features of mobile wireless technologies, such as LTE, to improve the overall quality of network access. Still another benefit is the improved coverage and reduced system complexity as compared with implementation of WiFi networks in large facilities. An additional benefit includes the enhanced scalability of mobile networks as compared with WiFi networks and wired networks.

The term "telecommunications," as used herein, is intended to encompass voice communications or telephony, as well as other forms of communications (e.g., video communications, videoconferencing, instant messaging or IM, Short Messaging Service or SMS, emails, etc.) that may take place electronically, for example, over wireless networks, packet-switched networks, or any combination thereof. As used herein, the term "telecommunications" may encompass mobile IP-based technologies such as LTE, LTE Advanced, and WiMax, which provide wireless devices with IP air interface access to networks with packet-switching cores.

The term "proxy connection," as used herein, means a connection created by an enterprise gateway to an external gateway as though it were a component of the external network, such that it is transparent to the external gateway that the enterprise gateway is actually an element of a separate network.

Figure 1:
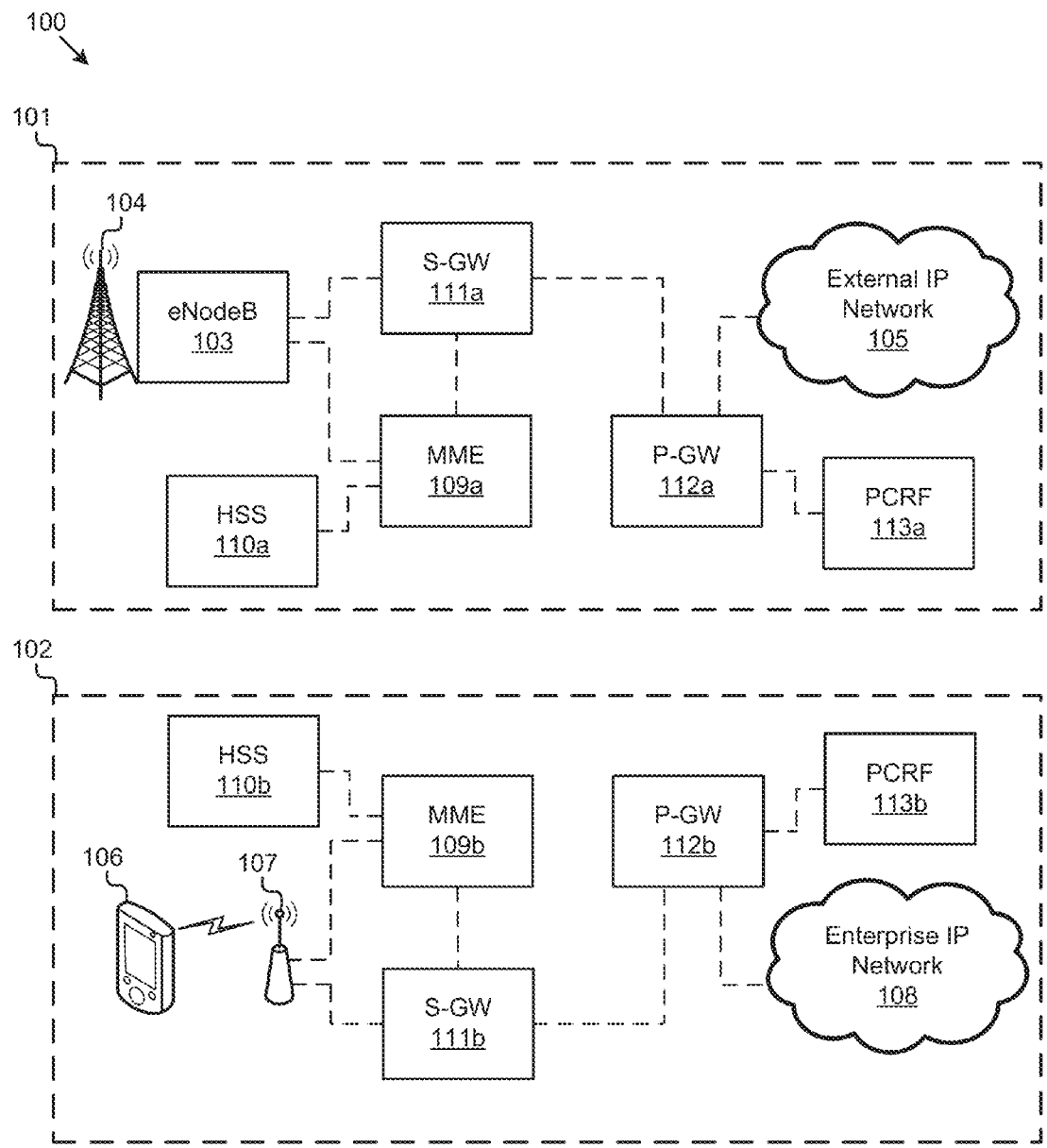
FIG. 1 is a block diagram illustrating one embodiment of a system for mobility in enterprise networks.

FIG. 1 is a block diagram illustrating one embodiment of a system 100 for mobility in enterprise networks. In one embodiment, the system 100 includes external network 101 connecting devices 106 to an external IP network 105, such as the Internet. The system 100 may also include an enterprise network 102 for connecting devices 106 to an enterprise IP network 108 comprising proprietary enterprise resources. The devices 106 may include a mobile communication device, such as a laptop, tablet, smartphone, or the like, which is configured to communicating according to a mobile communications standard such as an LTE standard, including LTE Advanced. One of ordinary skill in the art will recognize that the present embodiments may be implemented in accordance with any one of a number of mobile IP-based telecommunications technologies. For example, the described methods and systems may be implemented with other telecommunications technologies, including for example, WiMax communications. As used herein, the devices 106 may also be referred to as User Equipment (UE), which is a standard nomenclature in the mobile communications industry.

In an embodiment, the external network 101 may include, for example, a macro-layer communications cell. The external network 101 may include a cell antenna 104 and transceiver, which is commonly referred to as eNodeB 103 or Home eNodeB or (H-eNB). In an embodiment, eNodeB 103 may connect to a Servicing Gateway (S-GW) 111a and to a Mobility Management Entity (MME) device 109a. The MME 109a may also connect to a Home Subscriber Server (HSS) 110a and to the S-GW 111a. The S-GW 111a may also connect to a Packet Data Network (PDN) Gateway (P-GW) device 112a. The P-GW 112a may connect to a Policy Charging and Rules Function (PCRF) server 113a and to the external IP network 105.

Similarly, an enterprise network 102 implementing mobile communications technology may include an access point 107. The access point 107 may include an antenna 104 and eNodeB transceiver 103 as in the external network 101. Often, the access point 107 in an enterprise network 102 will be a micro-layer, or lower-layer access point. For example, the access point 107 may be a femto-layer access point. The access point 107 may communicate with an enterprise MME 109b and an enterprise S-GW 111b. The MME 109b may obtain subscriber information associated with the UE 106 subscriber of the enterprise network 102 from HSS 110b. The MME 109b may also communicate with the S-GW 111b. The S-GW 111b may pass communication requests to the P-GW 112b of the enterprise network 102. The P-GW 112b of the enterprise network 102 may receive a configuration profile from the PCRF 113b of the enterprise network 102. Additionally, the P-GW 112b may connect to resources on the enterprise IP network 108.

Figure 2:
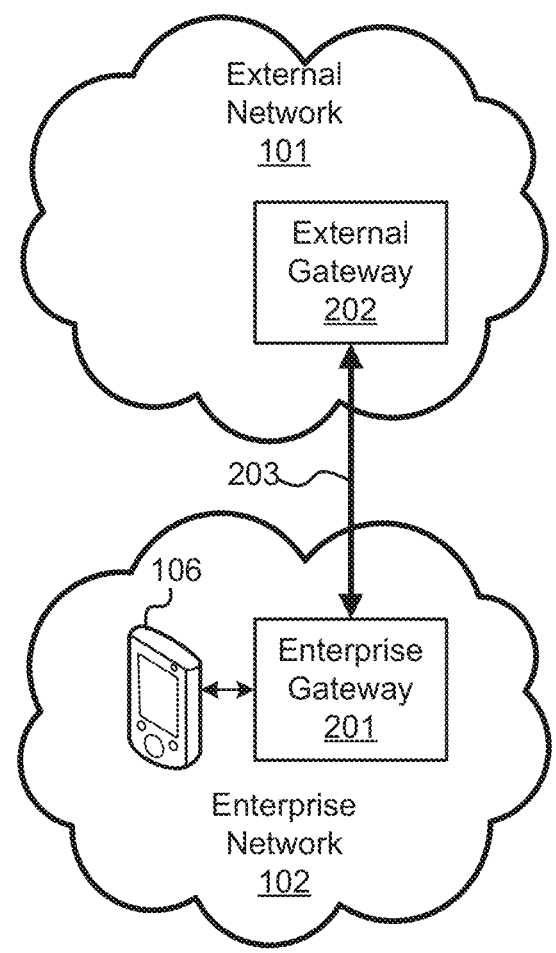
FIG. 2 is a block diagram illustrating an embodiment of a system for mobility in enterprise networks.

As shown in FIG. 2, the present embodiments may facilitate communications between the UE 106 and the external IP network 105. In such an embodiment, the enterprise network 102 may include an enterprise gateway device 201 which connects to an external gateway device 202 in the external network to establish a proxy connection 203. A proxy connection may be a secure connection between the enterprise gateway device 201 and the external gateway device 202, such as GTP. Thus, communications requests and responses may be passed from the UE 106 to the external IP network 105 via the proxy connection 203 established between the gateway devices 201, 202.

In one embodiment, the enterprise gateway device 201 may be a specially configured P-GW 112b. The P-GW 112b may be configured according to a profile obtained from PCRF 113b which is configured to cause the P-GW to establish the proxy connection with external gateway device 202.

In one embodiment, external gateway device 202 may be the P-GW device 112a on the external network 101. In another embodiment, the external gateway 202 may be the MME/S-GW 111a of the external network 101. In such embodiments, the proxy connection 203 may be established by the enterprise gateway 201 using a standard interface, such the external gateway device 202 does not require special configuration. Rather, the fact that the proxy connection 203 is actually established with the enterprise gateway 201 may be transparent to the external gateway device 202.

Figure 3:
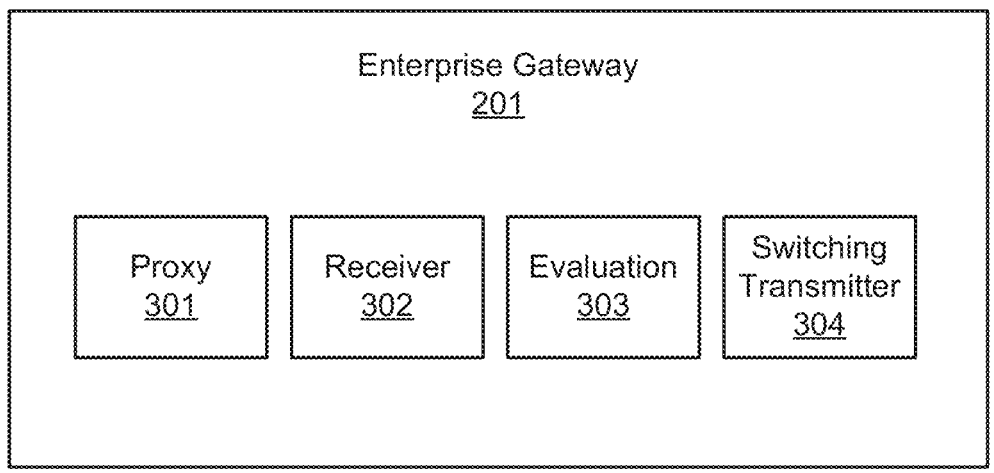
FIG. 3 is a block diagram illustrating one embodiment of an enterprise gateway device configured according to the present embodiments.

FIG. 3 illustrates one embodiment of an enterprise gateway 201. In an embodiment, the enterprise gateway 201 includes a proxy module 301 configured to establish a proxy connection with an external gateway 202 in response to a determination that a UE 106 has joined the enterprise network 102. To do so, the enterprise gateway 201 may retrieve a configuration profile from the PCRF 113b which may include configuration data used to configure proxy module 301, receiver 302, evaluation module 303 and switching transmitter 304. The configuration data may include information used to determine which device in the external network is the destination external gateway device 202. For example, the proxy module 301 may be configured to attempt to connect to P-GW 112a first. If attempts to connect to P-GW 112a are unsuccessful, proxy module 301 may be configured to connect to S-GW 111a or MME 109a.

Receiver module 302 may receive a communication request from UE 106. For example, the request may be received via S-GW 111b. Evaluation module 303 may then determine if the UE is requesting access to an enterprise resource or to a resource on the external network 101. If the UE 106 is requesting access to an enterprise resource, the switching transmitter 304 may pass the communication request to enterprise IP network 108. If, however, the UE 106 is requesting access to a resource on the external network, the switching transmitter 304 passes the request via the proxy connection 302 to the external gateway 202, which may forward the request to the external IP network 105.

Figure 4:
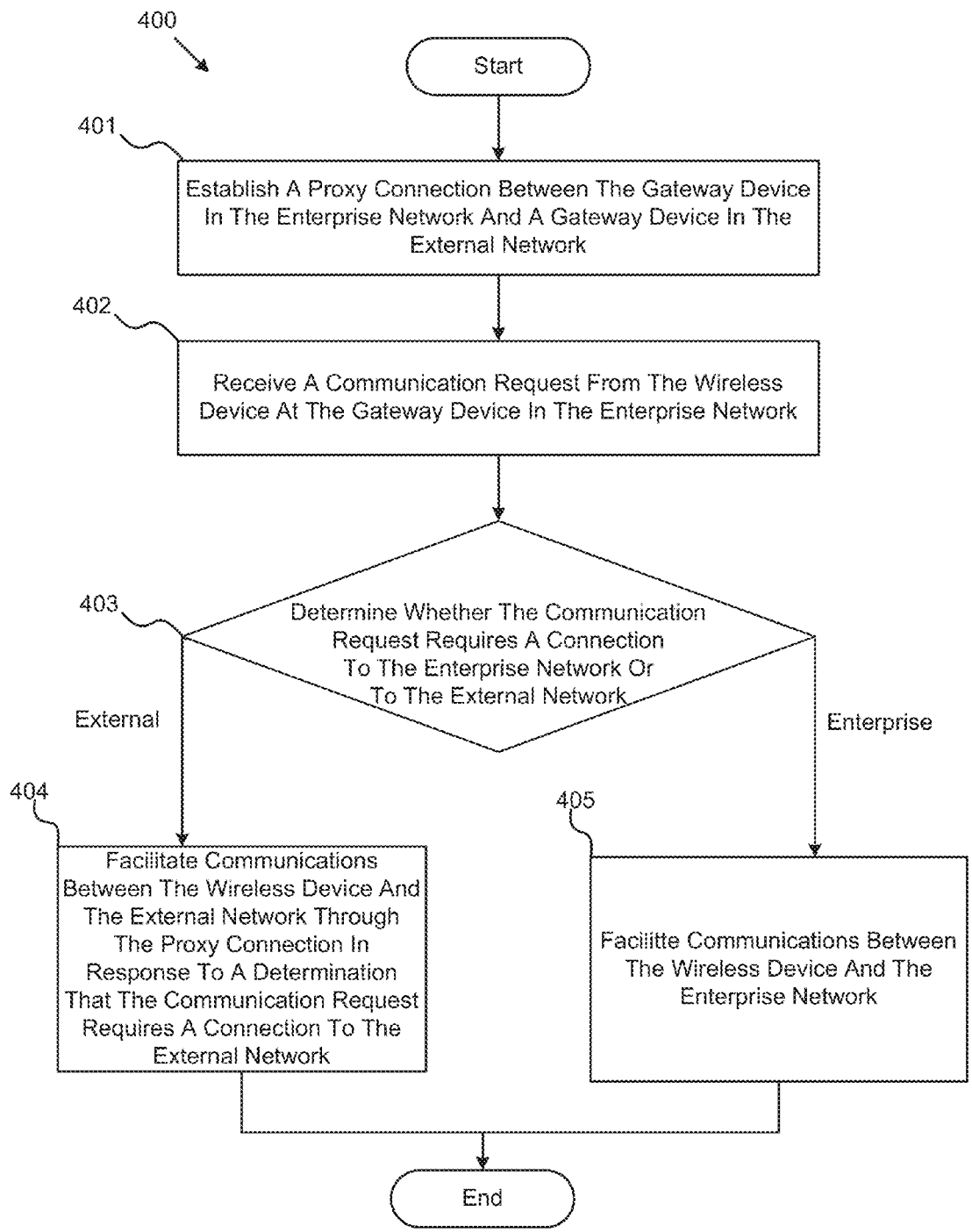
FIG. 4 is a flowchart diagram illustrating an embodiment of a method for mobility in enterprise networks.

FIG. 4 illustrates one embodiment of a method 400 which may be carried out by embodiments of an enterprise proxy 201. For example, the method 400 may start when proxy module 301 establishes 401a proxy connection 302 between the enterprise gateway 201 and external gateway 202. The receiver module 302 may then receive 402 a communication request from UE 106. The evaluation module 303 may then determine 403 whether the communication request requires a connection to the enterprise network 102 or to the external network 101. If the evaluation module 303 determines 403 that the communication request requires access to the enterprise network, the communication switching transmitter 304 may route 405 the request to the enterprise IP network 105. If, however, the evaluation module 403 determines 403 that the request requires access to the external network, then the switching transmitter 404 may facilitate 404 communications between the UE 106 and the external network 101 through the proxy connection 203.

Figure 5:
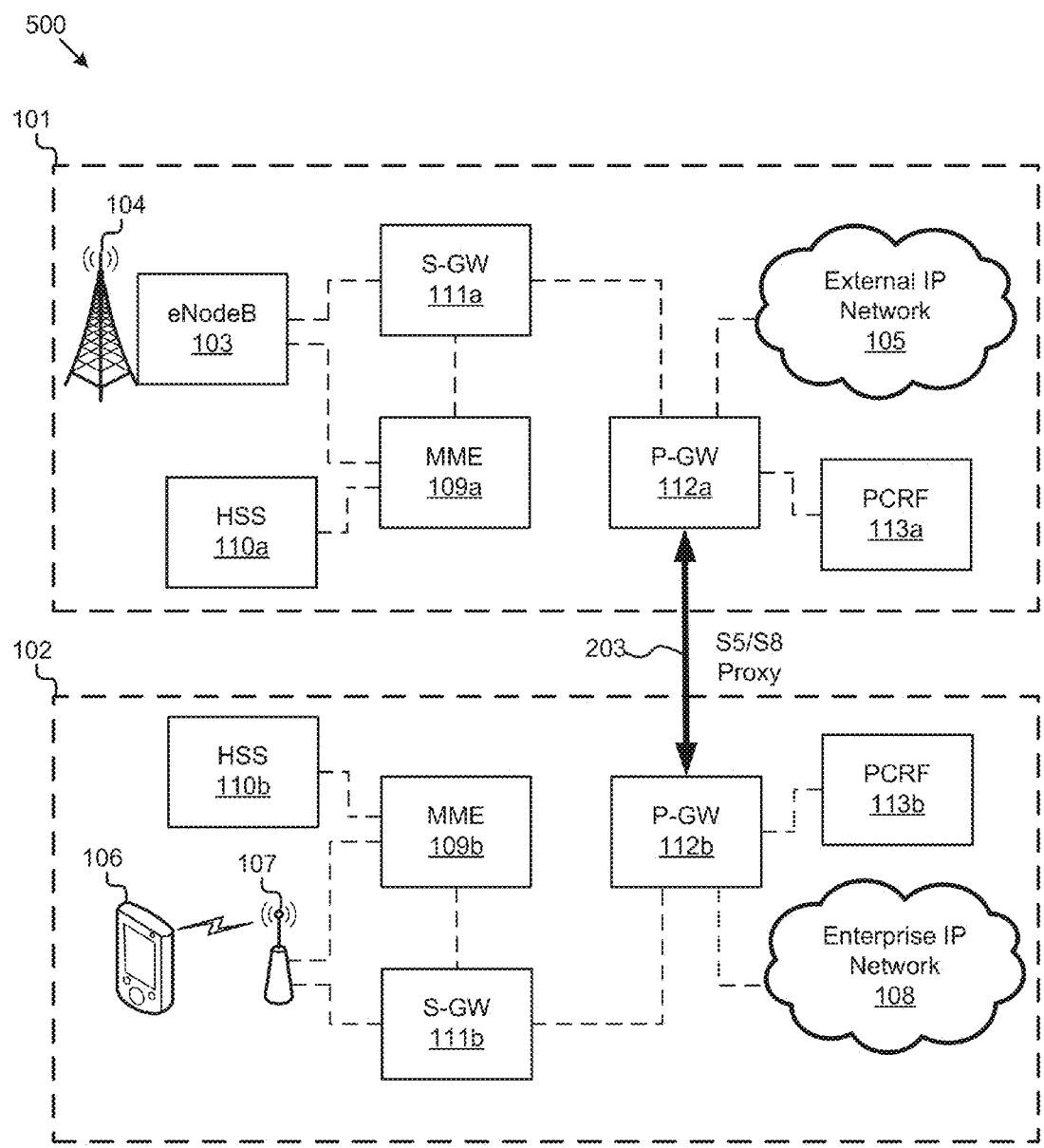
FIG. 5 is a block diagram illustrating one embodiment of a system for establishing a proxy connection.

FIG. 5 illustrates one embodiment of a system configuration 500 in which the proxy connection 203 is established between P-GW 112b of the enterprise network 102 and P-GW 112a of the external network 101. In such an embodiment, the proxy connection 203 may be established using either the S5 or the S8 interface of the P-GW 112a. In such an embodiment, the communication request from UE 106 would be routed through the proxy connection 203 established between P-GW 112b and P-GW 112a. P-GW 112a may then forward the request to the external IP network 105 and any associated responses back through the proxy connection 203 to the UE 106.

Figure 6:
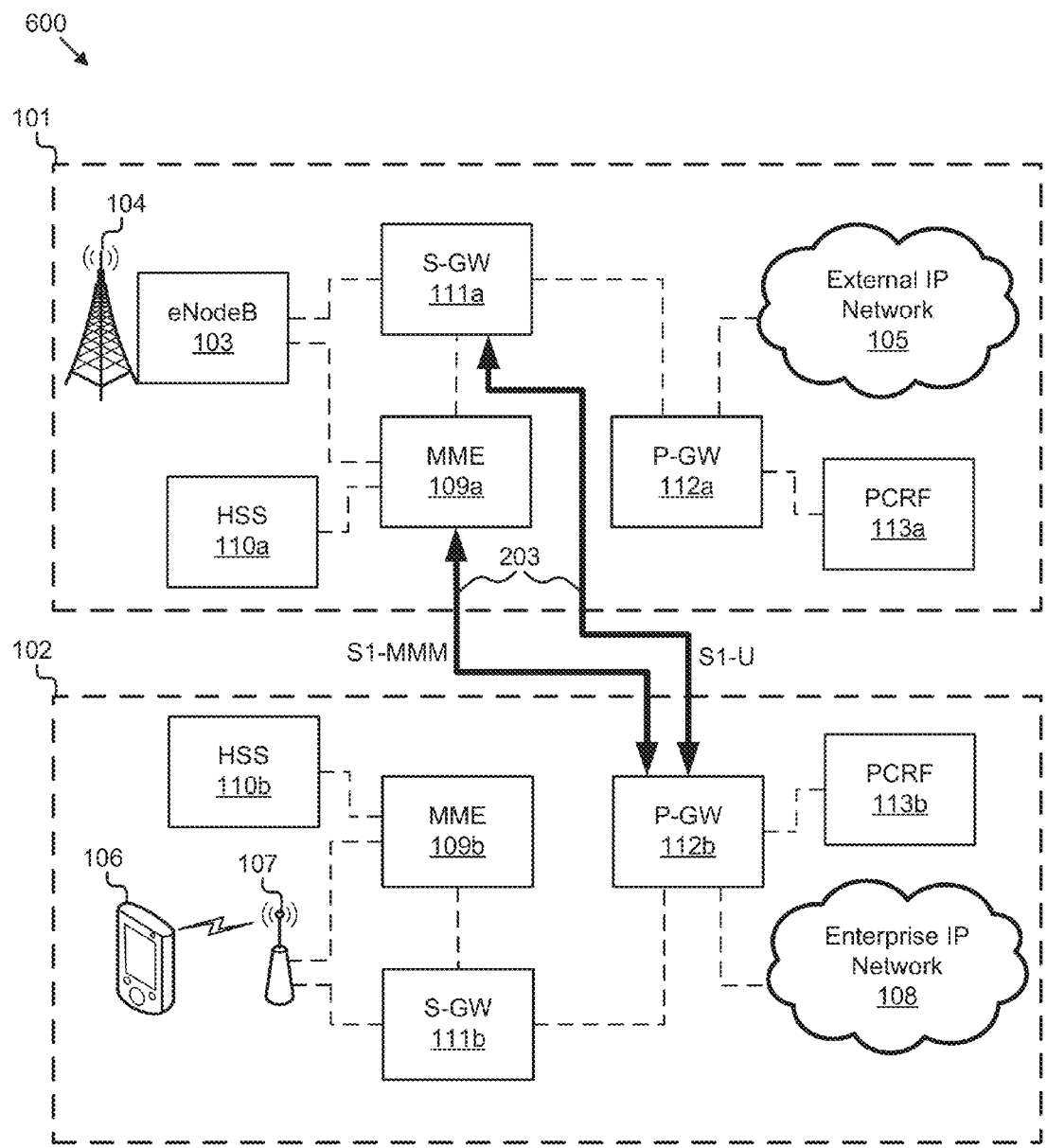
FIG. 6 is a block diagram illustrating another embodiment of a system for establishing a proxy connection.

FIG. 6 illustrates an alternative embodiment of a system configuration 600 in which the proxy connection 203 is established between P-GW 112b of the enterprise network 102 and MME 109a/S-GW 111a of the external network 101. In such an embodiment, the proxy connection 203 may be established using the S1-MME interface of the MME 109a and S1-U interface of the S-GW 111a. In such an embodiment, the communication request from UE 106 would be routed through the proxy connection 203 established between P-GW 112b and MME 109a/S-GW 111a. MME 109a/S-GW 111a may forward the request to P-GW 112a, which may then forward the request to the external IP network 105 and any associated responses back through the same path to proxy connection 203 and on to the UE 106.

Figure 7:
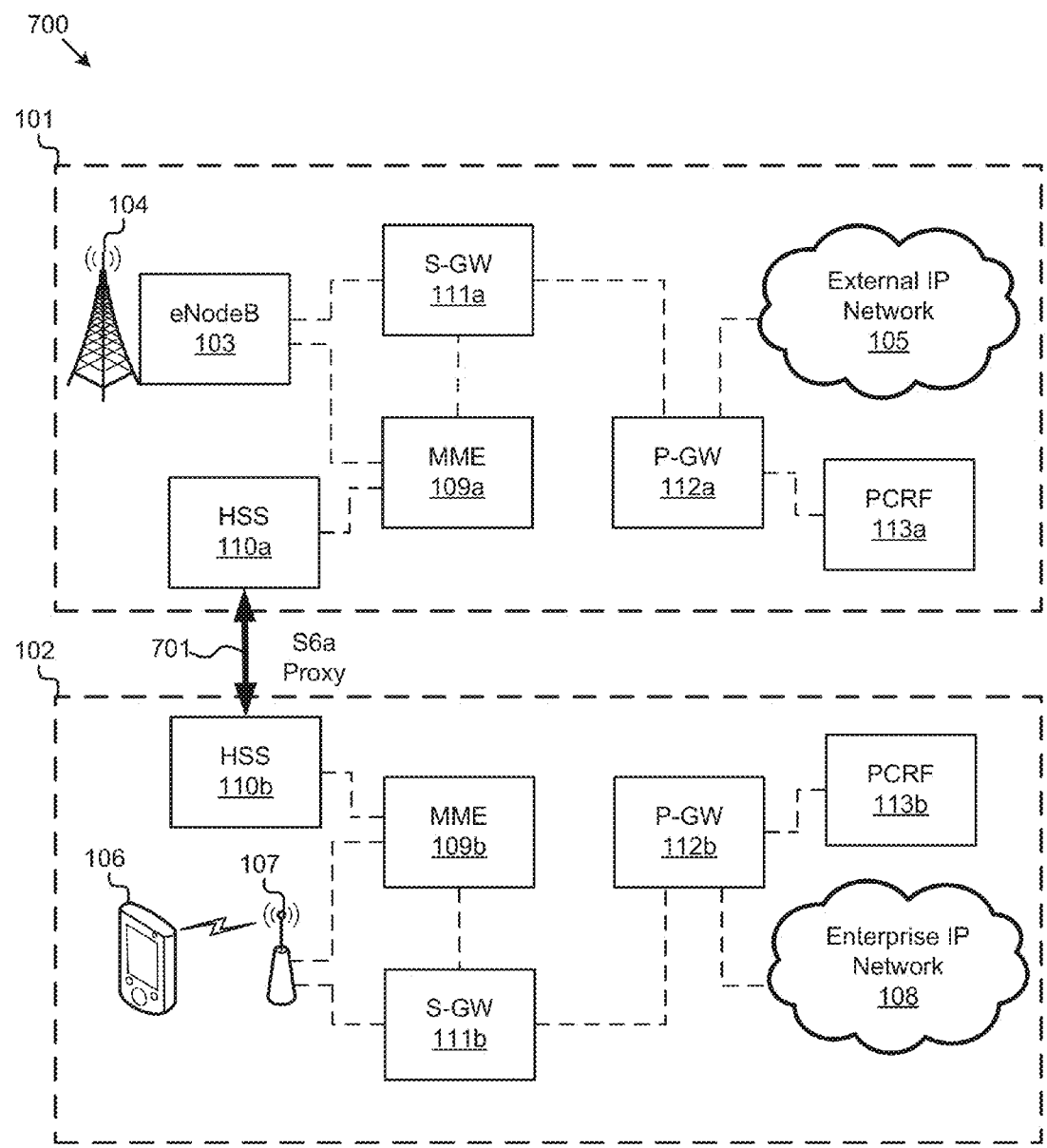
FIG. 7 is a block diagram illustrating one embodiment of a system for establishing a second proxy connection for obtaining subscriber configuration data.

In various embodiments, HSS 110b may require subscriber profile information from the external network 101 in order to enable the UE 106 to conduct communications with the external network 101. FIG. 7 illustrates a system configuration 700 suitable for obtaining the subscriber profile information. In such an embodiment, HSS 110b may establish a second proxy connection with HSS 110a of the external network via interface S6a. HSS 110b may obtain the subscriber profile information from HSS 110a and pass it to MME 109b for managing communications between UE 106 and the external network 101.

Figure 8:
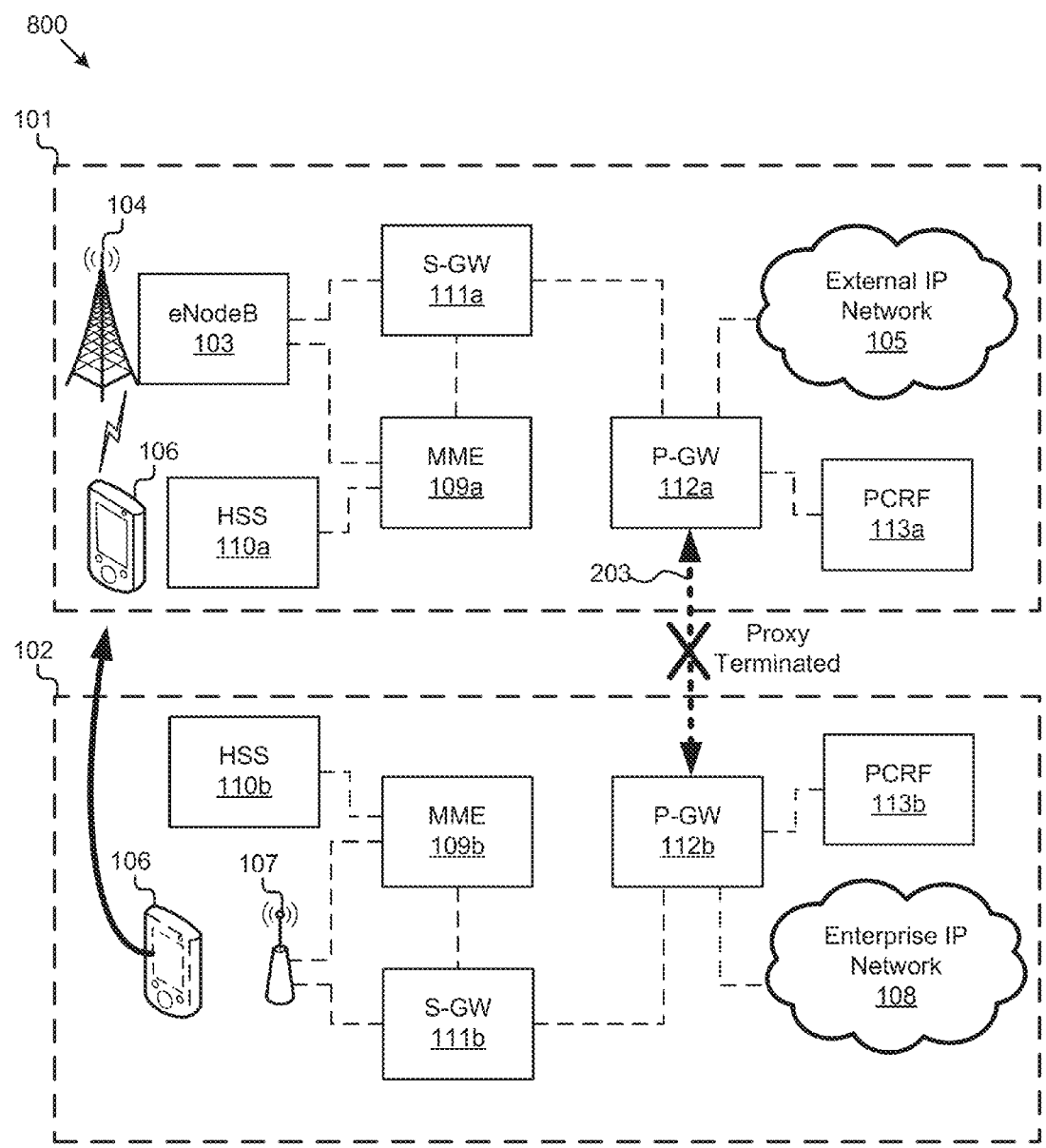
FIG. 8 is a block diagram illustrating one embodiment of a UE handover between an enterprise network and an external network.

FIG. 8 illustrates a system configuration change 800 resulting from the UE 106 moving from a connection to the enterprise network 102 to a direct connection to the external network 101. In such an embodiment, P-GW 112b may terminate the proxy connection 203 upon receiving a notification that UE 106 has left the enterprise network 102. Once the proxy connection 203 is terminated, the UE 106 can no longer communication with the external network 102 via the enterprise network 102. Indeed, the UE 106 may not be able to communicate at all with the enterprise network 102 once it has left its connection to access point 107 on the enterprise network 102.

In alternative embodiments, the UE 106 may move from one access point 107 to another access point 107 within the same enterprise network 102. In such an embodiment, the proxy connection 203 would not be terminated and the UE 106 would be able to communicate with the external network 101 via the proxy connection 203. In still another embodiment, the UE 106 may switch from one type of access point 107 to another type of access point within the enterprise network. For example, the UE 106 may switch from a mobile data connection, such as LTE, to a WiFi connection. As long as the new access point is still within the enterprise network 102, even if it is a different type of access point, the UE 106 may still be able to communicate with the external network 101 via the proxy connection 203.

Figure 9:
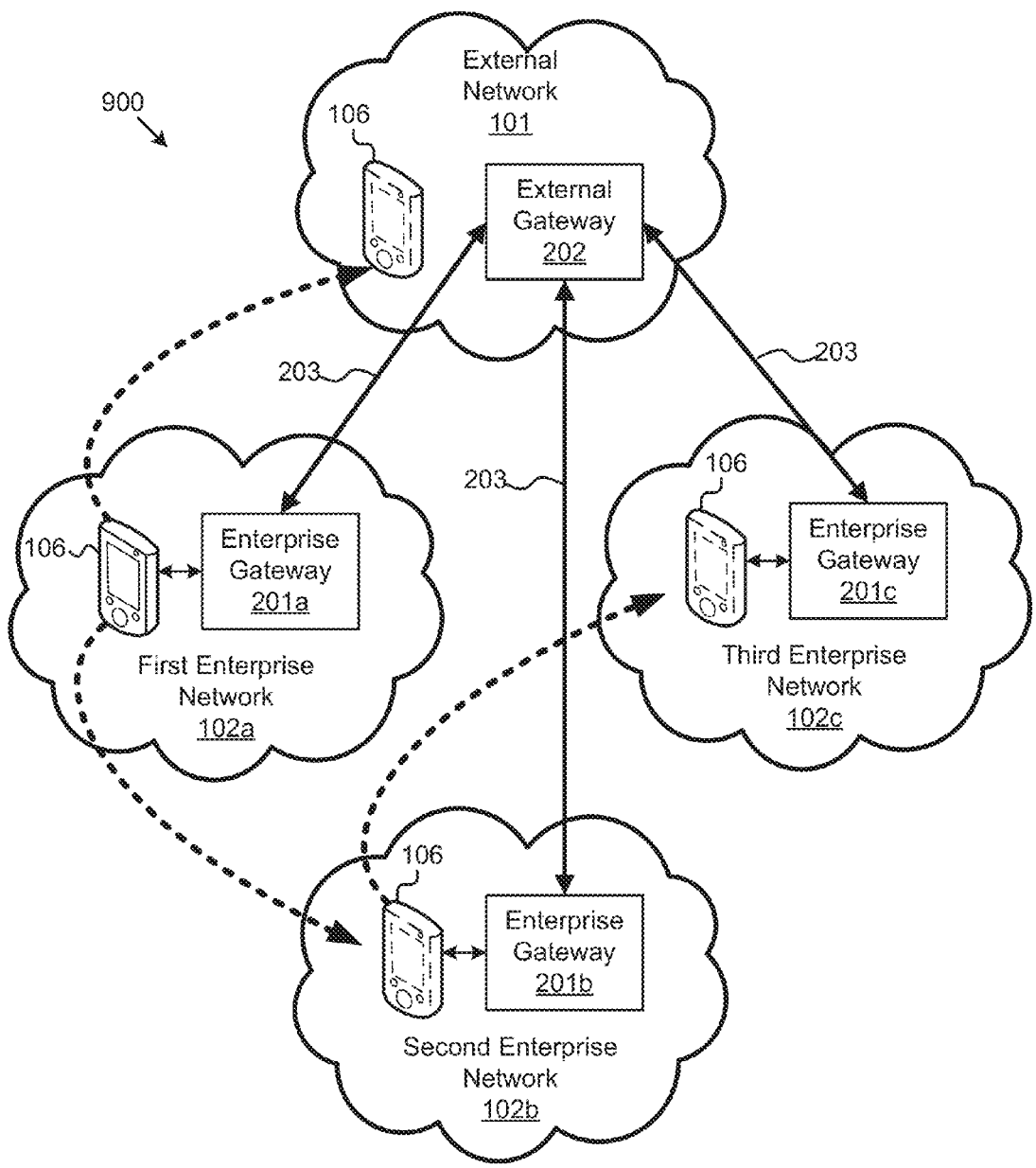
FIG. 9 is a block diagram illustrating one embodiment of a system with multiple enterprise networks.

FIG. 9 illustrates another embodiment of a system 900 in which the UE 106 may move from one enterprise to another. Such an example may be implemented where an enterprise has multiple access points 107 or in an embodiment where an enterprise has distributed facilities or campuses. In such an embodiment, a UE 106 may join a first enterprise network 102a at, for example, a first geographic location. The UE 106 may then move from the first enterprise network 102a to either a second enterprise network 102b or a third enterprise network 102c. In one embodiment, the UE 106 may move directly from the first enterprise network 102a to the second enterprise network 102b. In another embodiment, the UE 106 may move indirectly from the first enterprise network 102a to the third enterprise network 102c. During the transition from the first enterprise network 102a to the third enterprise network 102c, the UE 106 may access the external network 101 directly.

In the described embodiment, each enterprise network 102a-c may include an enterprise gateway 201a-c respectively. In one embodiment, each enterprise gateway 201a-c may establish a separate proxy connection 203 with the external gateway 202 in the external network. In another embodiment, a single proxy connection 203 may be established, for example between the first enterprise gateway 201*a* and the external gateway 202, and a dedicated connection between the first enterprise network 102*a* and the second enterprise network 102*b*, for example, may be established to pass communications from the UE 106 to the first enterprise gateway 201*a* and on to the external network 101.

Figure 10:
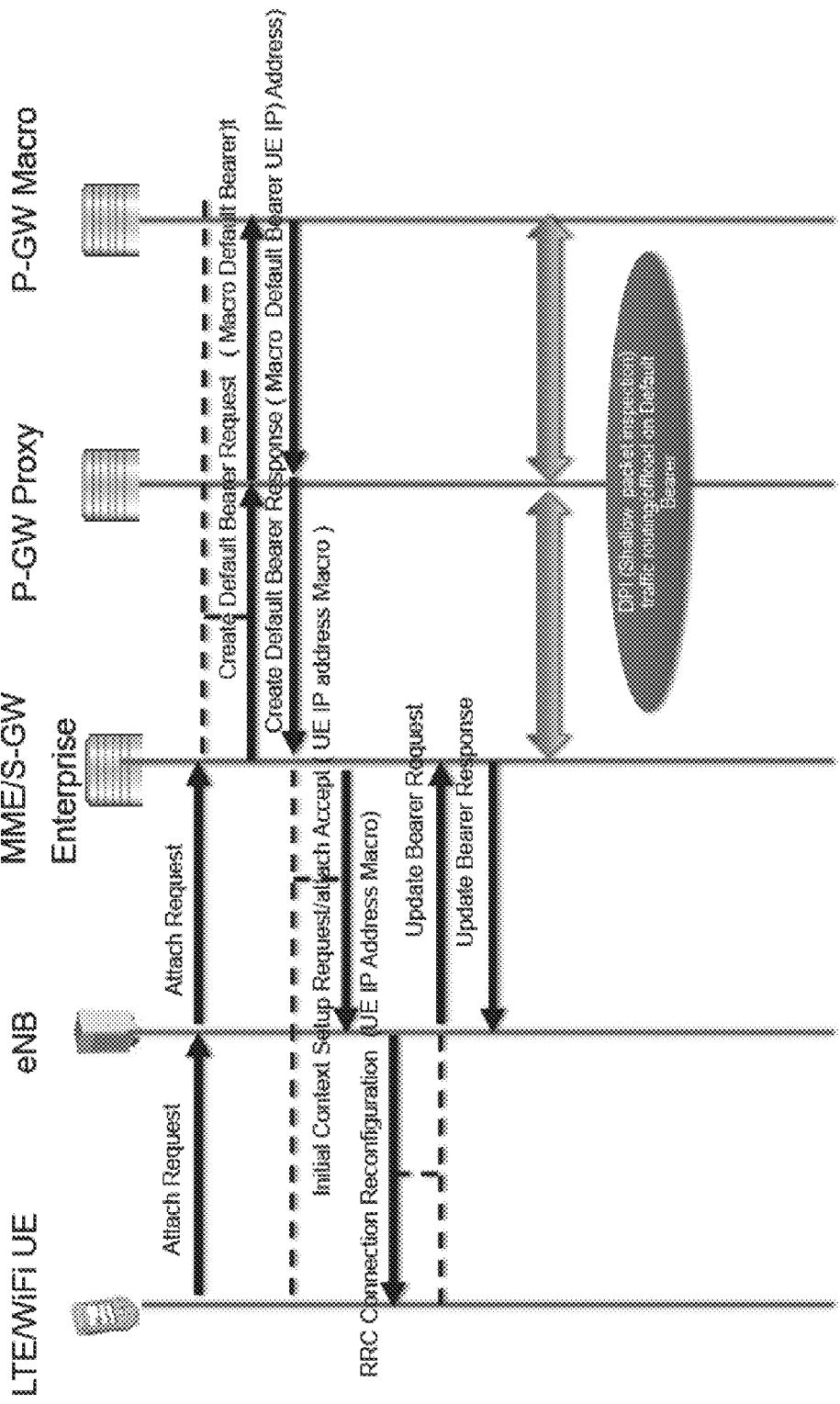
FIG. 10 is a signaling diagram illustrating one embodiment of a network attach process in the embodiment described in FIG. 5.

FIG. 10 is a signaling diagram illustrating one embodiment of a network attach process in the embodiment described in FIG. 5, where P-GW 112*b* establishes a proxy connection 302 with P-GW 112*a* of the external network 101. In this embodiment, the attach request is communicated from the UE 106 to the access point 107, which forwards it to the MME 109*b* and S-GW 111*b*. A default bearer request is generated and sent to the P-GW 112*b* of the enterprise network 102, which forwards the bearer request to the P-GW 112*a* of the external network 101. P-GW 112*a* then creates a default bearer response and transmits it back through the proxy connection 203 to P-GW 112*b*, which forwards the response back to S-GW 111*b*. The in initial context setup attach accept message is then related back to the access point 107 with the IP address for the UE 106. A connection reconfiguration message is sent to the UE 106 and an updated bearer request and response is communicated between the access point 107 and at least one of S-GW 111*b* and MME 109*b*. At that point, communications traffic may be conducted between the UE 106 and external IP network 105 via the proxy connection 203 between P-GW 112*b* and P-GW 112*a*.

Figure 11:
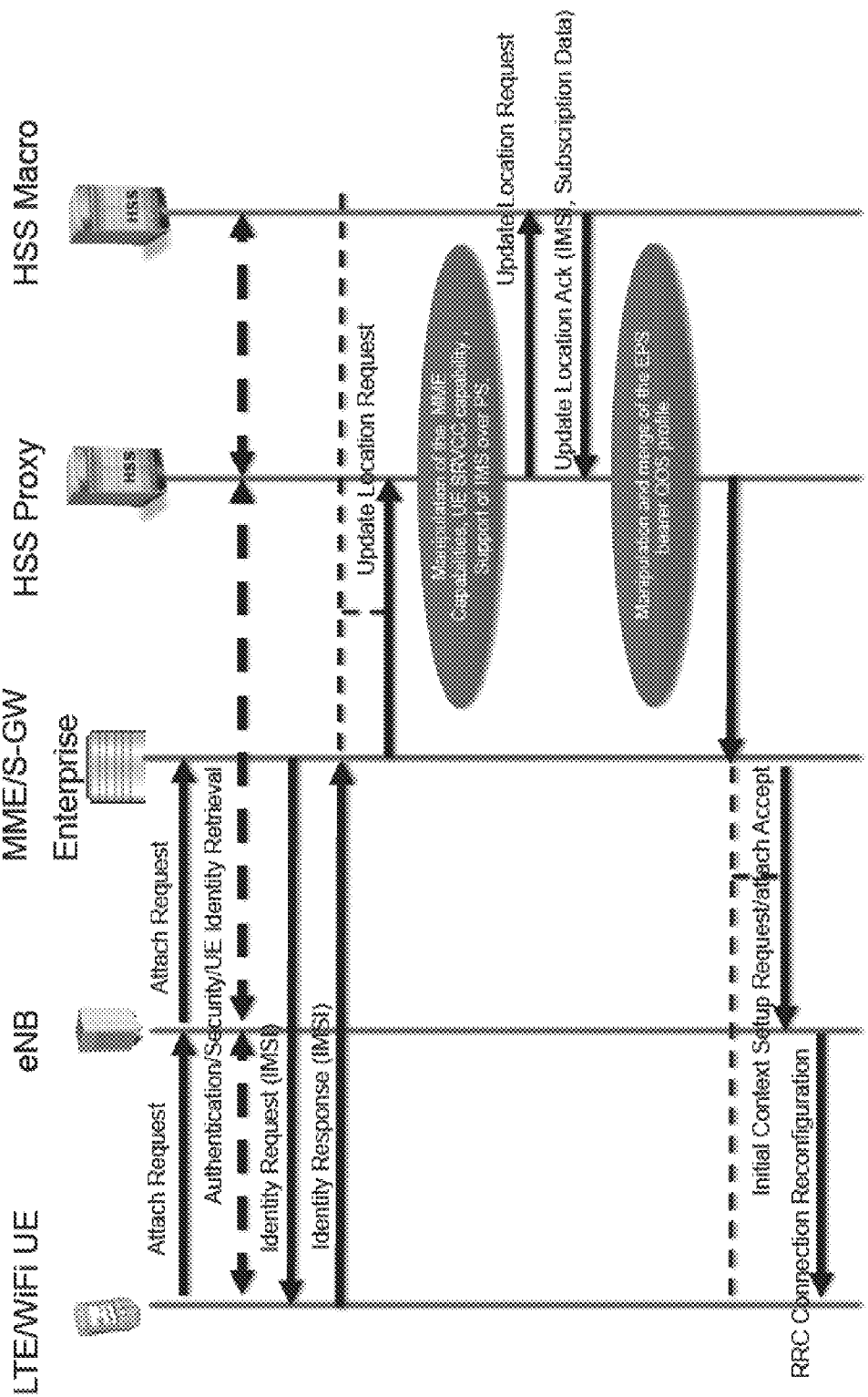
FIG. 11 is a signaling diagram illustrating one embodiment of establishing a second proxy connection for communication of subscriber profile information in the embodiment described in FIG. 8.

FIG. 11 is a signaling diagram illustrating one embodiment of establishing a second proxy connection 801 for communication of merged (enterprise and external) subscriber profile information in the embodiment described in FIG. 8. In such an embodiment, the second proxy connection 801 may be established between HSS 110*a* of the enterprise network and HSS 110*b* of the external network. Merged subscriber profile information may include, for example, a bearer QoS profile, configuration of MME capabilities, and support of other services such as Single Radio Voice Call Continuity (SRVCC) and the like.

Figure 12:
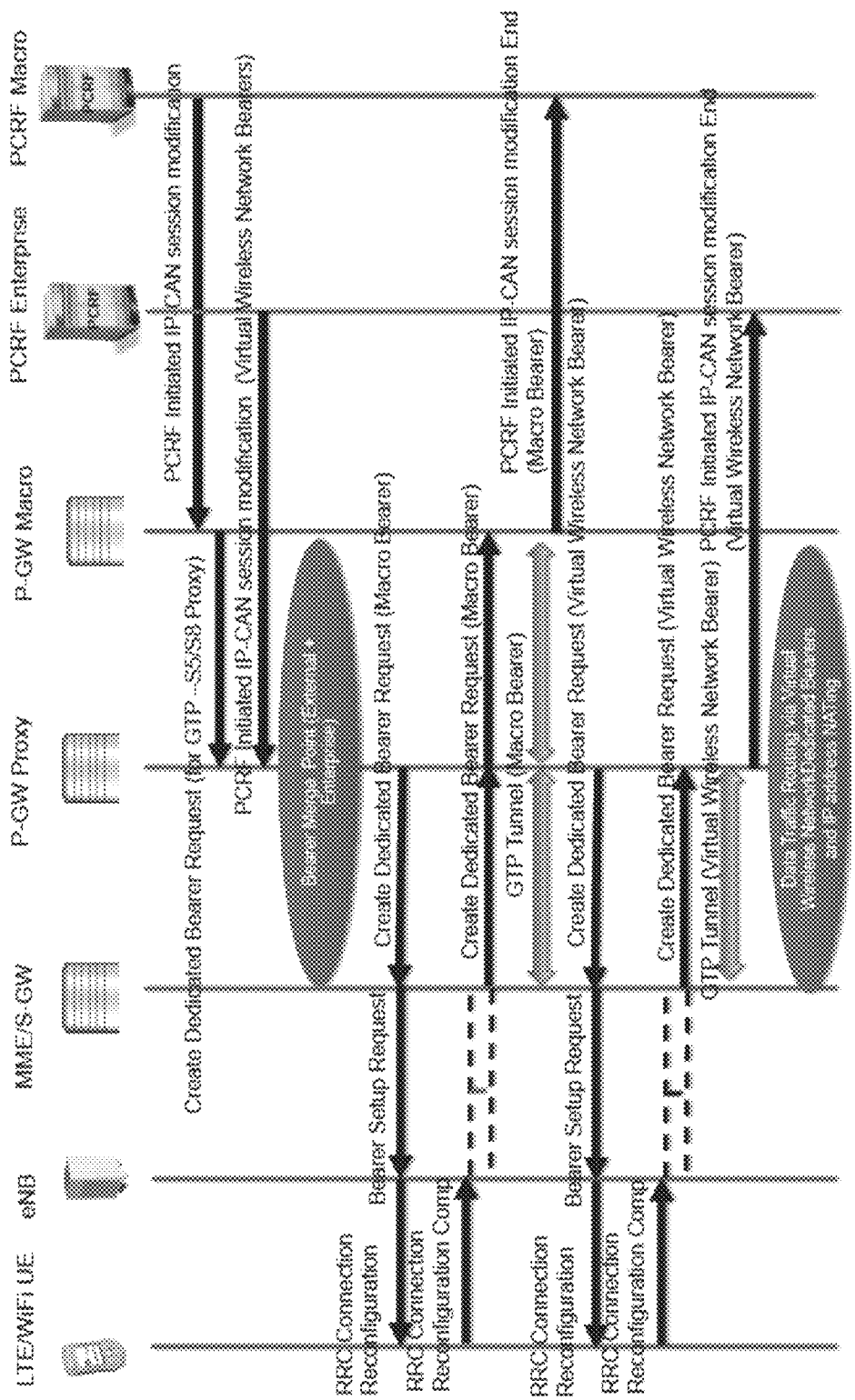
FIG. 12 is a signaling diagram illustrating one embodiment of a process for establishing a dedicated bearer.

FIG. 12 illustrates an embodiment of a process for establishing a dedicated bearer. In this embodiment, the PCRF 113*a* of the external network may communicate session modification information with the P-GW 112*a* of the external network, the P-GW 112*b* of the enterprise network, and the PCRF 113*b* of the enterprise network as illustrated. Such embodiments may utilize one or more GTP tunnels to establish the dedicated bearer connection.

Figure 13:
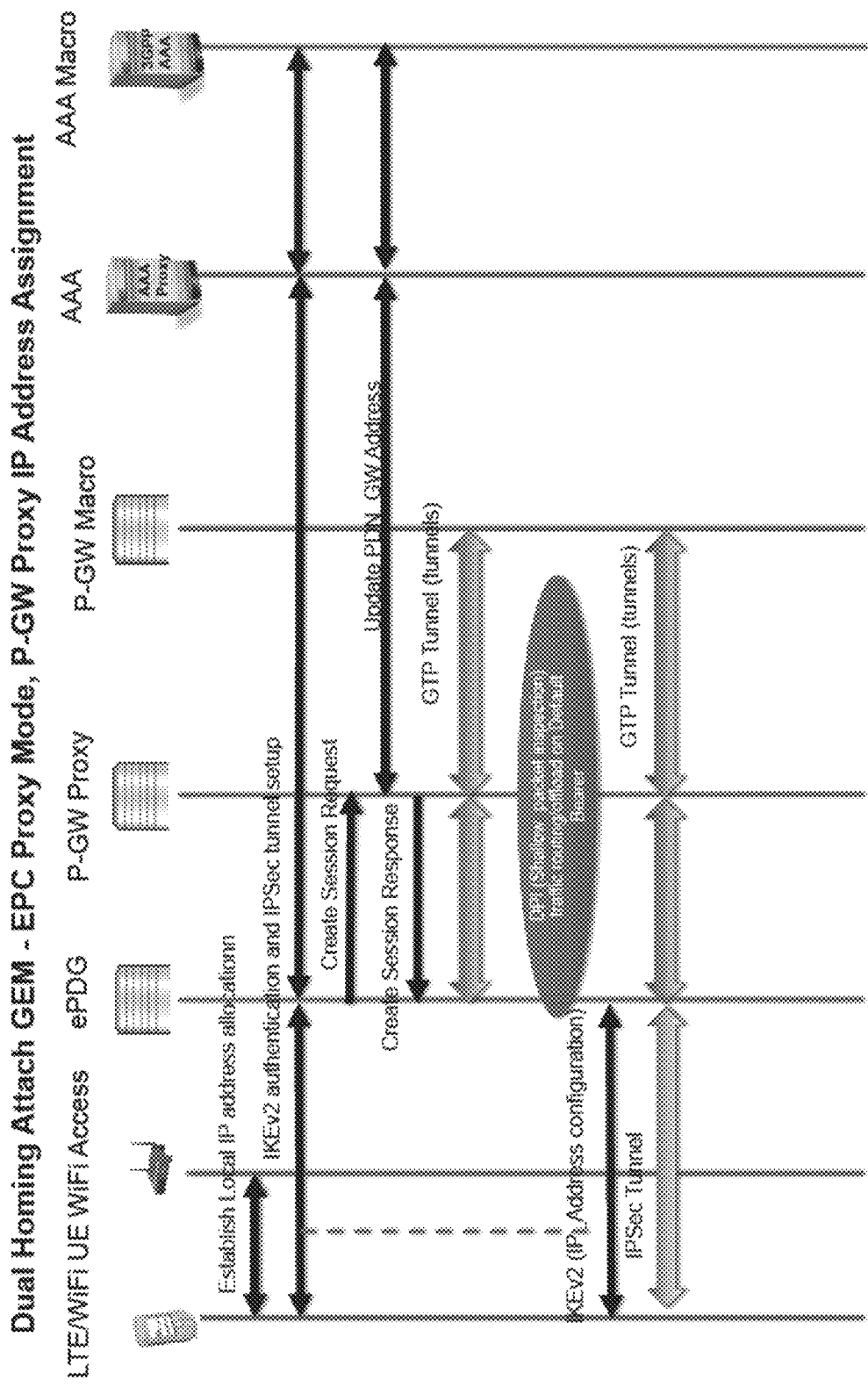
FIG. 13 is a signaling diagram illustrating one embodiment of assigning an IP address in systems according to the present embodiments.

FIG. 13 illustrates a method for assigning an IP address in systems according to the present embodiments. In such an embodiment, the system may include an Authentication, Authorization, and Accounting (AAA) server used for assignment of the addresses. In some embodiments, the AAA server may be a separate device (not shown). Alternatively, the AAA server may be integrated with HSS 110*a,b*. In the illustrated embodiment, the AAA may provide an updated PDN gateway address for establishing a General Packet Radio Service (GPRS) Tunneling Protocol (GTP) tunnel. In one embodiment, the proxy connection 203 may be established over the GTP tunnel(s) set up according to the embodiment of FIG. 13.

Figure 14:
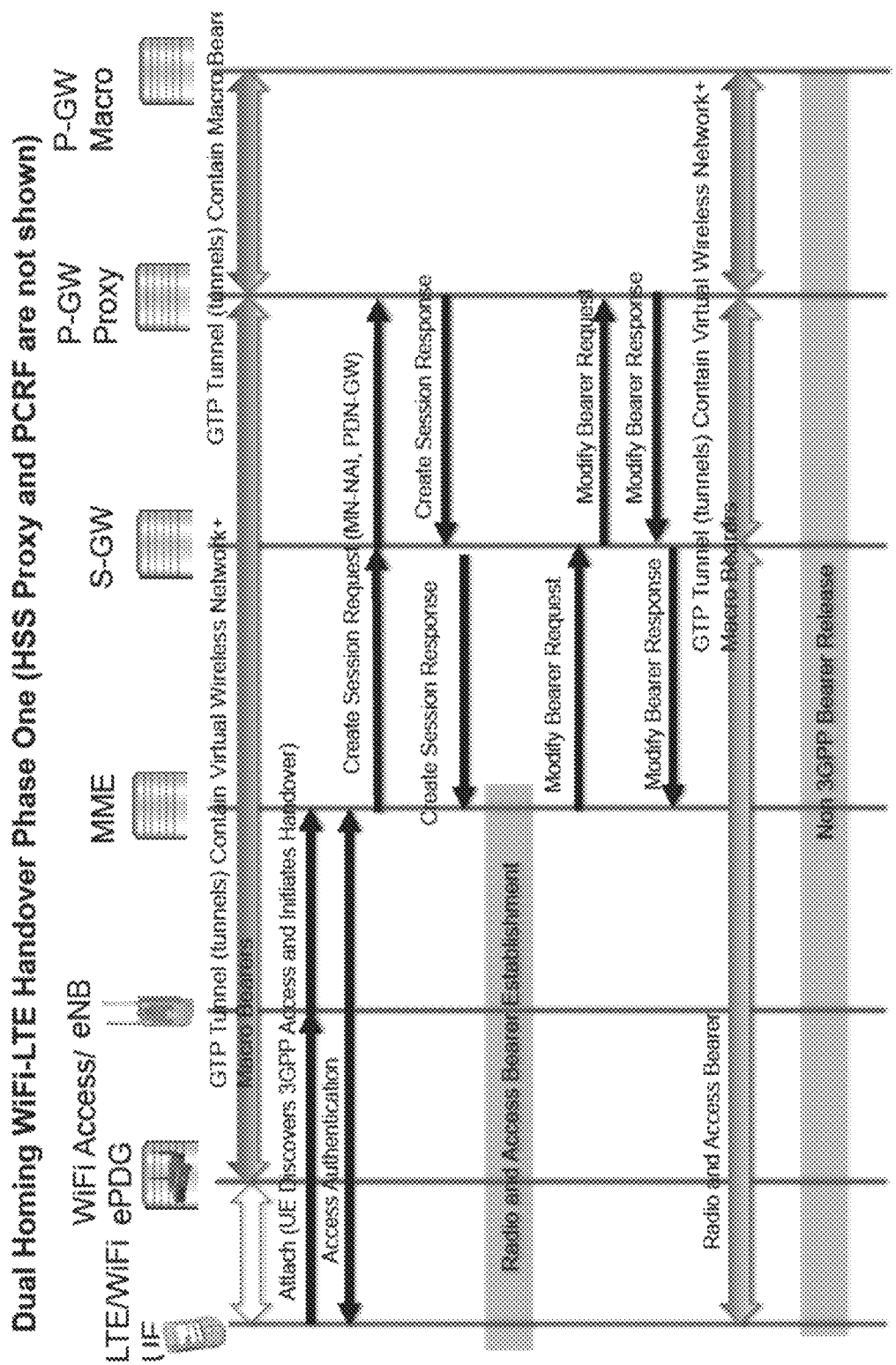
FIG. 14 is a signaling diagram illustrating one embodiment of a first phase of a process for handling handover of a UE.

FIG. 14 illustrates a first phase of an embodiment of a process for handling handover of a UE 106 from a WiFi connection to a mobile wireless connection, such as LTE. In such an embodiment, the UE 106 discovers a mobile data access point 107. In various embodiments, the WiFi access point may also be connected to the mobile data access point 107. In such an embodiment, the GTP tunnel may already be established between the WiFi access point and the external network 101. The UE 106 may generate a set of access and authentication requests for creating a new communication session through a direct connection with the mobile data access point 107 (e.g., eNB). In such an embodiment, the radio and access bearer may be established and modified to establish a direct bearer (e.g., a 3GPP bearer) between the UE 106 and the enterprise network 102. Once the direct bearer is established, the bearer associated with the link to the UE 106 through the WiFi access point may be released.

Figure 15:
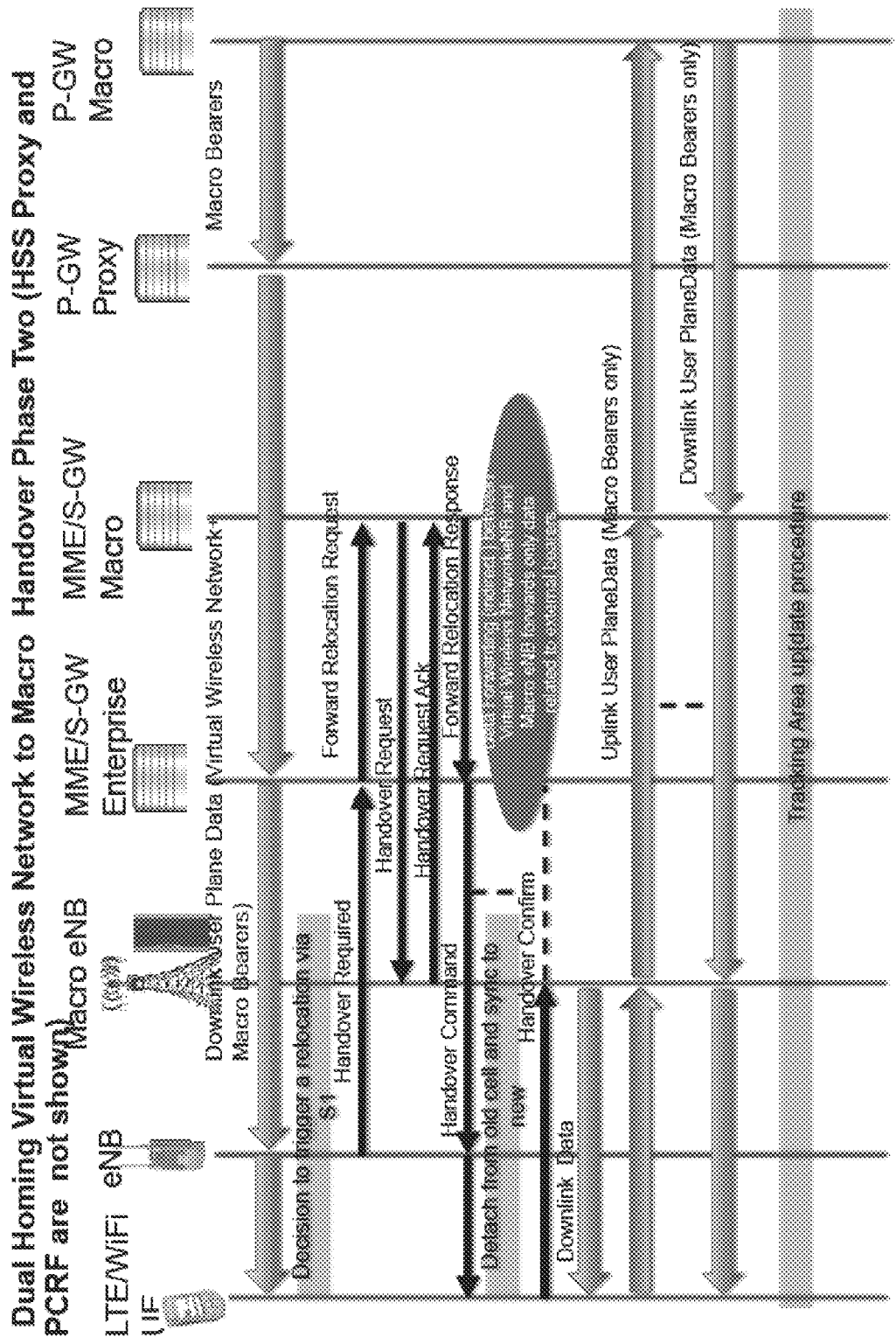
FIG. 15 is a signaling diagram illustrating one embodiment of a second phase of a process for handling handover of a UE.

An embodiment of the second phase of the handover process is described in FIG. 15. In this embodiment, the handover takes place between the mobile data access point 107 of the enterprise network 102 and the access point (eNB) 103, 104 of the external network.

Figure 16:
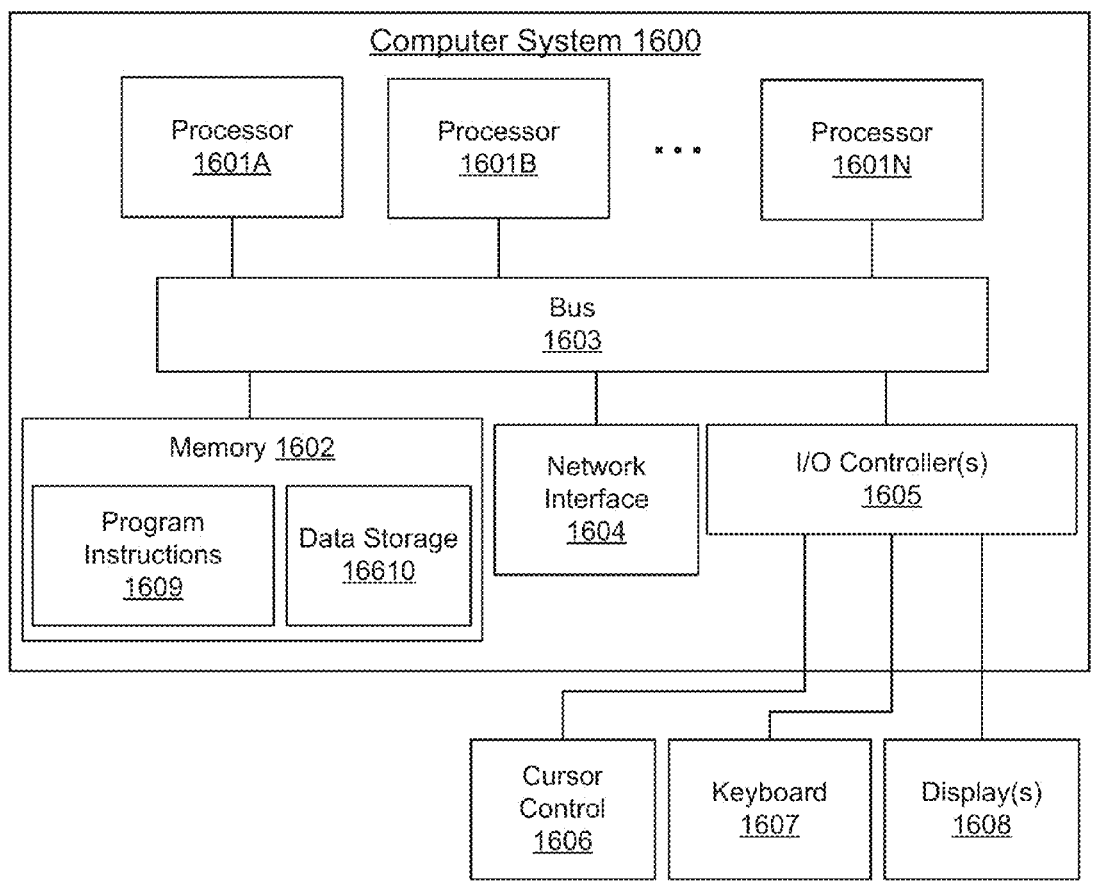
FIG. 16 is a block diagram illustrating one embodiment of a computer system that may be configured according to the present embodiments.

FIG. 16 is a schematic block diagram illustrating one embodiment of a computer system 1600 configurable for mobility in enterprise networks. In one embodiment, various components of the external network 101 and the enterprise network 102, including the HSS 110*a,b*, the MME 109*a,b*, the S-GW 111*a,b*, and the P-GW 112*a,b* may be implemented on a computer system similar to the computer system 1600 described in FIG. 16. Similarly, enterprise gateway 201 and external gateway 202 may be implemented on a computer system similar to the computer system 1600 described in FIG. 16. In various embodiments, computer system 1600 may be a server, a mainframe computer system, a workstation, a network computer, a desktop computer, a laptop, dedicated special purpose device, or the like.

As illustrated, computer system 1600 includes one or more processors 1601A-N coupled to a system memory 1602 via bus 1603. Computer system 1600 further includes network interface 1604 coupled to bus 1603, and input/output (I/O) controller(s) 1605, coupled to devices such as cursor control device 1606, keyboard 1607, and display(s) 1608. In some embodiments, a given entity (e.g., MME 109, S-GW 111, or P-GW 112) may be implemented using a single instance of computer system 1600, while in other embodiments multiple such systems, or multiple nodes making up computer system 1600, may be configured to host different portions or instances of embodiments.

In various embodiments, computer system 1600 may be a single-processor system including one processor 1601A, or a multi-processor system including two or more processors 1601A-N (e.g., two, four, eight, or another suitable number). Processor(s) 1601A-N may be any processor capable of executing program instructions. For example, in various embodiments, processor(s) 1601A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 1601A-N may commonly, but not necessarily, implement the same ISA. Also, in some embodiments, at least one processor(s) 1601A-N may be a graphics processing unit (GPU) or other dedicated graphics-rendering device.

System memory 1602 may be configured to store program instructions and/or data accessible by processor(s) 1601A-N. For example, memory 1602 may be used to store software program and/or database shown in FIGS. 4 and 10-15. In various embodiments, system memory 1602 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 1602 as program instructions 1609 and data storage 1605, respectively. In other embodiments, program instructions and/or data may be received, sent or stored upon different types of computer-accessible media or on similar media separate from system memory 1602 or computer system 1600. Generally speaking, a computer-accessible medium may include any tangible, non-transitory storage media or memory media such as electronic, magnetic, or optical media—e.g., disk or CD/DVD-ROM coupled to computer system 1600 via bus 1603, or non-volatile memory storage (e.g., "flash" memory)

The terms "tangible" and "non-transitory," as used herein, are intended to describe a computer-readable storage medium (or "memory) excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 1603 may be configured to coordinate I/O traffic between processor 1601, system memory 1602, and any peripheral devices including network interface 1604 or other peripheral interfaces, connected via I/O controller(s) 1605. In some embodiments, bus 1603 may perform any necessary protocol, timing or other data transformations to convert data signals from one component (e.g., system memory 1602) into a format suitable for use by another component (e.g., processor(s) 1601A-N). In some embodiments, bus 1603 may include support for devices attached through various types of peripheral buses, such as a variant of the Peripheral Component Interconnect (PCI) bus standard or the Universal Serial Bus (USB) standard, for example. In some embodiments, the operations of bus 1603 may be split into two or more separate components, such as a north bridge and a south bridge, for example. In addition, in some embodiments some or all of the operations of bus 1603, such as an interface to system memory 1602, may be incorporated directly into processor(s) 1601A-N.

Network interface 1604 may be configured to allow data to be exchanged between computer system 1600 and other devices, such as other computer systems attached to P-GW 112b, for example. In various embodiments, network interface 1604 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 1605 may, in some embodiments, enable connection to one or more display terminals, keyboards, keypads, touch screens, scanning devices, voice or optical recognition devices, or any other devices suitable for entering or retrieving data by one or more computer system 1600. Multiple input/output devices may be present in computer system 1600 or may be distributed on various nodes of computer system 1600. In some embodiments, similar I/O devices may be separate from computer system 1600 and may interact with computer system 1600 through a wired or wireless connection, such as over network interface 1604.

As shown in FIG. 16, memory 1602 may include program instructions 1609, configured to implement certain embodiments described herein, and data storage 1605, comprising various data accessible by program instructions 1609. In an embodiment, program instructions 1609 may include software elements of embodiments illustrated in FIGS. 4 and 10-15. For example, program instructions 1609 may be implemented in various embodiments using any desired programming language, scripting language, or combination of programming languages and/or scripting languages (e.g., C, C++, C#, Java™, JavaScript™, Perl, etc.). Data storage 1605 may include data that may be used in these embodiments such as, for example, HSS 110a,b or PCRF 113a,b. In other embodiments, other or different software elements and data may be included.

A person of ordinary skill in the art will appreciate that computer system 1600 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Embodiments of enterprise gateway 201 described in FIGS. 2-3 may be implemented in a computer system that is similar to computer system 1600. In one embodiment, the elements described in FIGS. 2-3 may be implemented in discrete hardware modules. Alternatively, the elements may be implemented in software-defined modules which are executable by one or more of processors 1601A-N, for example.

The present embodiments provide several benefits over previous communication techniques. For example, the present embodiments offer flexibility in configuration by allowing the UE to access the external network 101 from the enterprise network 102 via proxy connections established via multiple potential routes. One mode, EPC proxy mode, provides a proxy connection between P-GW 112a and P-GW 112b. A second mode, HeNB proxy mode, provides a proxy connection between MME 109a/S-GW 111a and P-GW 112b.

Beneficially, these two modes may each comply with 3GPP R10 EPC standards. As such, both modes may support full local mobility without requiring routing of communications through an external network 101. Additionally, the two modes may support handouts to and handins from the external network 101 (Macro EPC). The two modes may additionally support traffic localization (offload) by keeping traffic local within a virtual wireless network. The two modes may also provide dual homing functionality, anchoring on the enterprise network (virtual wireless network) EPC and on the external network (Macro) EPC. Such embodiments allow options for additional manipulation of the UE and QoS profiles via unique HSS proxy and PCRF proxy capabilities.

This flexibility of modes may provide additional features, including options for allowing creation of multiple enterprise networks (e.g., enterprise networks 102a-c), providing traffic localization and routing of data traffic on a per-UE basis, and providing additional mobility subscription options (e.g., internal and to/from external).

Such embodiments may additionally provide the flexibility of, for example, LTE infrastructure working in tandem with WiFi infrastructure. Such embodiments may provide unified QoS between mobile data networks and WiFi networks. As such, the present embodiments may provide optimization between IMS and wireless network on QoS, routing, and registration levels.

Although certain embodiments are described herein with reference to specific examples, numerous modifications and changes may be made in light of the foregoing description. Accordingly, the specification and figures are to be regarded in an illustrative rather than a restrictive sense, and all such modifications are intended to be included within their scope. Any benefits, advantages, or solutions to problems that are described herein with regard to specific embodiments are not to be construed as a critical, required, or essential feature or element of any or all the claims. Furthermore, it should be understood that the various operations described herein may be implemented in software, hardware, or a combination thereof. The order in which each operation of a given technique is performed may be changed, and the elements of the systems illustrated herein may be added, reordered, combined, omitted, modified, etc. It is intended that the embodiments described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as "connected" and/or "in communication with," although not necessarily directly, and not necessarily mechanically. The terms "a" and "an" are defined as one or more unless stated otherwise. The terms "comprise" (and any form of comprise, such as "comprises" and "comprising), "have" (and any form of have, such as "has" and "having), "include" (and any form of include, such as "includes" and "including) and "contain" (and any form of contain, such as "contains" and "containing) are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for providing a wireless device with simultaneous access to an enterprise network and an external network, comprising:
   establishing a proxy connection between a gateway device in the enterprise network and a gateway device in the external network as though the gateway device in the enterprise network is a component of the external network, transparent to the gateway device in the external network that the gateway device in the enterprise network is not an element of the external network;
   receiving a communication request from the wireless device at the gateway device in the enterprise network;
   determining whether the communication request requires a connection to the enterprise network or to the external network; and
   facilitating communications between the wireless device and the external network through the proxy connection in response to a determination that the communication request requires a connection to the external network, the proxy connection transparent to the wireless device and the external network.

2. The method of claim 1, wherein the wireless device is configured to operate according to a mobile data communications standard.

3. The method of claim 2, wherein the mobile data communications standard is the Long Term Evolution (LTE) communications standard.

4. The method of claim 2, wherein the wireless device is also configured to operate according to WiFi standards.

5. The method of claim 1, wherein the gateway in the enterprise network is a Packet Data Network (PDN) Gateway (P-GW) device.

6. The method of claim 1, wherein the gateway in the external network is a Packet Data Network (PDN) Gateway (P-GW) device.

7. The method of claim 6, wherein the gateway in the enterprise network presents itself to the P-GW device in the external network as at least one of a Mobility Management Entity (MME) device or a Servicing Gateway (S-GW) device of the external network.

8. The method of claim 6, wherein the gateway in the enterprise network connects to the P-GW device in the external network via a standard connection on at least one of interfaces S5 or S8.

9. The method of claim 1, wherein the gateway in the external network is a Servicing Gateway (S-GW) device.

10. The method of claim 9, wherein the gateway in the enterprise network presents itself to the S-GW device in the external network as a Home eNodeB Gateway (HeNB-GW) device of the external network.

11. The method of claim 9, wherein the gateway in the enterprise network connects to the S-GW device in the external network via a connection on a standard S1-U interface.

12. The method of claim 1, wherein the gateway in the external network is a Mobility Management Entity (MME) device.

13. The method of claim 12, wherein the gateway in the enterprise network presents itself to the MME device in the external network as a Home eNodeB Gateway (HeNB-GW) device of the external network.

14. The method of claim 12, wherein the gateway in the enterprise network connects to the S-GW device in the external network via a connection on a standard S1-MME interface.

15. The method of claim 1, further comprising obtaining User Equipment (UE) configuration information for enabling the wireless device to communicate with the external network from a Home Subscriber Server (HSS) of the external network through a second proxy connection established between an HSS of the enterprise network and the HSS of the external network.

16. The method of claim 15, wherein establishing the second proxy connection further comprises the HSS of the enterprise network connecting to the HSS of the external network on interface S6a.

17. The method of claim 1, further comprising providing Quality of Service (QoS) services for connections between the wireless device and the external network via the proxy connection.

18. The method of claim 1, further comprising terminating the proxy connection in response to a determination that the wireless device has terminated a connection with the enterprise network.

19. A tangible computer-readable storage medium having program instructions stored thereon that, upon execution by a processor, cause the processor to perform operations for providing a wireless device with simultaneous access to an enterprise network and an external network, comprising:
 establishing a proxy connection between a gateway device in the enterprise network and a gateway device in the external network as though the gateway device in the enterprise network is a component of the external network, transparent to the gateway device in the external network that the gateway device in the enterprise network is not an element of the external network;
 receiving a communication request from the wireless device at the gateway device in the enterprise network;
 determining whether the communication request requires a connection to the enterprise network or to the external network; and
 facilitating communications between the wireless device and the external network through the proxy connection in response to a determination that the communication request requires a connection to the external network, the proxy connection transparent to the wireless device and the external network.

20. A system for providing a wireless device with simultaneous access to an enterprise network and an external network, comprising:
 a gateway device in the enterprise network configured to:
 establish a proxy connection between the gateway device in the enterprise network and a gateway device in the external network as though the gateway device in the enterprise network is a component of the external network, transparent to the gateway device in the external network that the gateway device in the enterprise network is not an element of the external network;
 receive a communication request from the wireless device at the gateway device in the enterprise network;
 determine whether the communication request requires a connection to the enterprise network or to the external network; and
 facilitate communications between the wireless device and the external network through the proxy connection in response to a determination that the communication request requires a connection to the external network, the proxy connection transparent to the wireless device and the external network.

21. A system, comprising:
 a first interface for establishing a proxy connection with a gateway device in an external network, transparent to the gateway device that the first interface is not a component of the external network;
 a second interface configured to receive a communication request from a wireless device in an enterprise network; and
 a processor coupled to the first interface and to the second interface, the processor configured to:
 determine whether the communication request requires a connection to the enterprise network or to the external network; and
 facilitate communications between the wireless device and the external network through the proxy connection in response to a determination that the communication request requires a connection to the external network, the proxy connection transparent to the wireless device and the external network.

* * * * *